United States Patent
Turnbull et al.

(10) Patent No.: US 9,242,576 B1
(45) Date of Patent: Jan. 26, 2016

(54) METHOD AND APPARATUS FOR CONTROLLING AN ELECTRIC MACHINE

(71) Applicant: GM GLOBAL TECHNOLOGY OPERATIONS LLC, Detroit, MI (US)

(72) Inventors: Paul F. Turnbull, Canton, MI (US); Steven L. Hayslett, Troy, MI (US); Harry J. Bauer, Troy, MI (US); Daniel J. Berry, Macomb Township, MI (US); George D. Dolan, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/340,642

(22) Filed: Jul. 25, 2014

(51) Int. Cl.
 *H02P 29/00* (2006.01)
 *B60L 15/20* (2006.01)

(52) U.S. Cl.
 CPC ............. *B60L 15/20* (2013.01); *H02P 29/00* (2013.01)

(58) Field of Classification Search
 None
 See application file for complete search history.

(56) References Cited

U.S. PATENT DOCUMENTS

| | | | | | |
|---|---|---|---|---|---|
| 5,446,362 | A * | 8/1995 | Vanek | .............. | B60L 3/00 318/432 |
| 5,977,742 | A * | 11/1999 | Henmi | .............. | B60L 3/0023 318/778 |
| 6,775,624 | B2 * | 8/2004 | Storino | ............ | G06Q 30/02 702/34 |
| 6,922,640 | B2 * | 7/2005 | Vezzu | ............ | G07C 3/00 700/90 |
| 7,112,941 | B2 * | 9/2006 | Chrostowski | ........ | B60L 15/10 318/432 |
| 7,149,657 | B2 * | 12/2006 | Goebel | ............ | G06Q 10/06 700/108 |
| 7,353,094 | B2 * | 4/2008 | Okoshi | ............ | B60K 6/445 180/65.1 |
| 7,443,122 | B2 * | 10/2008 | Tate | ............ | B60L 3/0023 318/434 |
| 7,583,041 | B2 * | 9/2009 | Yamaguchi | ......... | B60L 1/003 310/53 |
| 7,595,600 | B2 * | 9/2009 | Patel | ............ | H02P 21/148 318/400.32 |
| 7,615,951 | B2 * | 11/2009 | Son | ............ | H02P 29/0055 318/432 |
| 7,911,167 | B2 * | 3/2011 | Takeuchi | ......... | B60L 3/06 180/65.1 |
| 7,950,842 | B2 * | 5/2011 | Pryor, Jr. | ......... | A47J 43/0766 366/142 |
| 8,195,374 | B2 * | 6/2012 | Suzuki | ............ | B60L 3/06 318/432 |
| 8,442,712 | B2 * | 5/2013 | Qian | ............ | H02H 7/222 374/178 |
| 9,048,766 | B2 * | 6/2015 | Perisic | ............ | H02P 29/0061 |

(Continued)

*Primary Examiner* — Jonathan M Dager
(74) *Attorney, Agent, or Firm* — Quinn Law Group, PLLC

(57) ABSTRACT

A method for operating an electric machine of a ground vehicle includes periodically determining an aging parameter based upon a temperature of the electric machine and periodically determining a short-term aging effect based upon the periodically determined aging parameter. A long-term aging effect is determined based upon the short-term aging effect. A short-term temperature adjustment is determined based upon the short-term aging effect and a long-term temperature adjustment is determined based upon the long-term aging effect. A temperature-based derated motor torque is determined based upon the long-term temperature adjustment and the short-term temperature adjustment. Operation of the electric machine is controlled responsive to an operator command for torque based upon the temperature-based derated motor torque.

17 Claims, 2 Drawing Sheets

(56) References Cited

U.S. PATENT DOCUMENTS

| | | | |
|---|---|---|---|
| 2002/0107589 A1* | 8/2002 | Grimm | G05B 23/0245 700/90 |
| 2008/0054835 A1* | 3/2008 | Tamaru | H02P 25/08 318/634 |
| 2008/0055799 A1* | 3/2008 | Serizawa | H02H 7/0833 361/24 |
| 2009/0105918 A1* | 4/2009 | Kobayashi | F16H 61/143 701/67 |
| 2009/0132116 A1* | 5/2009 | Tanaka | B60L 1/003 701/36 |
| 2009/0189561 A1* | 7/2009 | Patel | H02H 7/0852 318/806 |
| 2010/0222953 A1* | 9/2010 | Tang | B60L 15/2036 701/22 |
| 2011/0050141 A1* | 3/2011 | Yeh | H02P 29/0072 318/434 |
| 2011/0095717 A1* | 4/2011 | Takizawa | B60L 1/06 318/473 |
| 2011/0213518 A1* | 9/2011 | Welchko | B60L 15/20 701/22 |
| 2011/0279074 A1* | 11/2011 | Yeh | G01K 7/42 318/432 |
| 2012/0209477 A1* | 8/2012 | Ono | E05F 15/70 701/49 |
| 2012/0306422 A1* | 12/2012 | Hao | G01K 7/22 318/490 |
| 2012/0330483 A1* | 12/2012 | Campbell | H02P 23/14 701/22 |
| 2014/0021898 A1* | 1/2014 | Hendrickson | H02P 29/0044 318/434 |
| 2014/0062371 A1* | 3/2014 | Schultz | H02K 9/04 318/471 |
| 2014/0139172 A1* | 5/2014 | Yamada | H02P 6/16 318/626 |
| 2014/0180511 A1* | 6/2014 | Daum | B60W 20/00 701/22 |
| 2014/0222265 A1* | 8/2014 | Miftakhov | B60L 15/2045 701/22 |
| 2015/0006001 A1* | 1/2015 | Kawata | B60K 6/48 701/22 |
| 2015/0120105 A1* | 4/2015 | Naqvi | B60L 15/20 701/22 |
| 2015/0229249 A1* | 8/2015 | Jang | H02P 9/006 318/139 |

\* cited by examiner

METHOD AND APPARATUS FOR CONTROLLING AN ELECTRIC MACHINE

TECHNICAL FIELD

This disclosure relates to an electric machine, and operational control of the electric machine related to operating temperature.

BACKGROUND

The statements in this section merely provide background information related to the present disclosure and may not constitute prior art.

Powertrain systems employing electric machines for tractive torque derate motor torque based upon a single control parameter, e.g., motor temperature, with tractive torque effort derated as a function of the motor temperature to avoid reduced service life of the electric machine. In one embodiment, torque derating occurs in a temperature range between a minimum temperature for derating, e.g., 170° C. and a maximum permissible operating temperature, e.g., 190° C. This includes permitting maximum motor torque at motor temperatures below the minimum temperature for derating, linearly derating the motor torque as motor temperature increases thereabove, e.g., from 170° C. to 190° C. and permitting zero motor torque output, i.e., prohibiting motor torque output when the motor temperature reaches the maximum permissible operating temperature.

Under one known severe driving schedule, an electric machine can spend a majority of its operating time operating at motor temperatures slightly less than the minimum temperature for derating, e.g., at approximately 160° C. A motor control approach employing motor temperature as a single control parameter permits indefinite operation of an electric machine at motor temperatures that are slightly below the minimum temperature for derating, affecting its service life. Furthermore, a motor control approach employing motor temperature as a single control parameter prohibits short-duration high temperature excursions even though such excursions may not affect service life.

SUMMARY

A method for operating an electric machine of a ground vehicle is described, and includes periodically determining an aging parameter based upon a temperature of the electric machine and periodically determining a short-term aging effect based upon the periodically determined aging parameter. A long-term aging effect is determined based upon the short-term aging effect. A short-term temperature adjustment is determined based upon the short-term aging effect and a long-term temperature adjustment is determined based upon the long-term aging effect. A temperature-based derated motor torque is determined based upon the long-term temperature adjustment and the short-term temperature adjustment. Operation of the electric machine is controlled responsive to an operator command for torque based upon the temperature-based derated motor torque.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
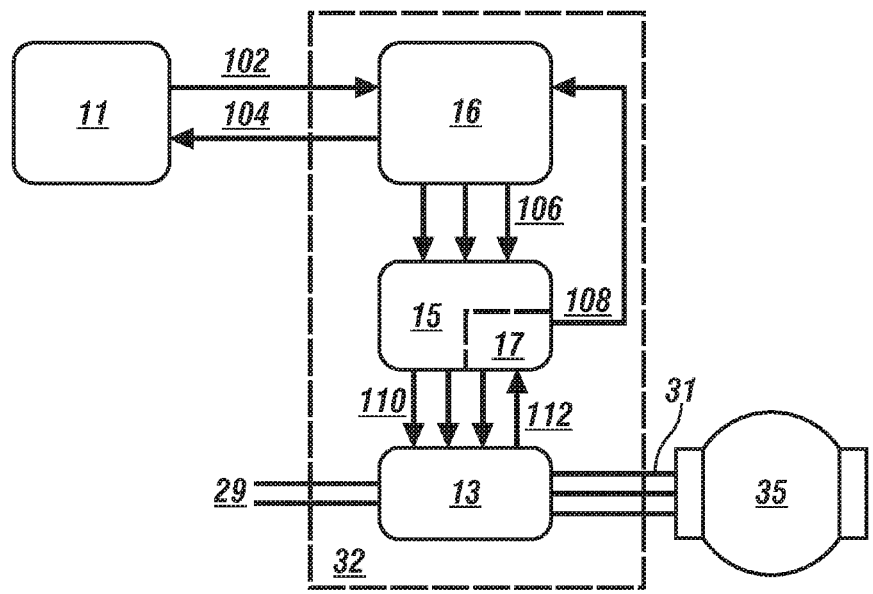
FIG. 1 schematically illustrates an electrically-powered electric machine coupled to an inverter module that is controlled by a controller of control system, in accordance with the disclosure.

Referring now to the drawings, wherein the depictions are for the purpose of illustrating certain exemplary embodiments only and not for the purpose of limiting the same, FIG. 1 schematically illustrates an electrically-powered torque machine (electric machine) 35 coupled to an inverter module 32 that is controlled by a controller 11 of a control system. When employed on a ground vehicle, an output member of the electric machine 35 may rotatably couple to a vehicle driveline to transmit tractive torque to a drive wheel, either directly or through a transmission gear system or a belt-drive assembly. The inverter module 32 and/or the electric machine 35 may be configured with a cooling system to transfer heat away therefrom.

The inverter module 32 includes a motor control processor (MCP) 16, a gate drive circuit 15 and power switches 13. The power switches 13 include IGBTs or other suitable power switch devices that electrically connect between high and low power lines of a high-voltage DC bus 29. In one embodiment, each power switch 13 includes input pins for monitoring electrical current flow through the power switch 13. The gate-drive circuit 15 generates and employs pulsewidth-modulation (PWM) to control the power switches 13 to transfer electric power from the high-voltage DC bus 29 through a multi-phase motor control power bus 31 to the electric machine 35 for tractive torque generation in either an acceleration mode or a regenerative braking mode. In operation, the controller 11 generates a motor torque command 102 that is communicated to the MCP 16, which generates PWM duty cycle control commands 106 that are communicated to the gate drive 15 in response to the motor torque command 102. The gate-drive circuit 15 generates a plurality of PWM control signals 110 to control the power switches 13 to control electric power flow between the high-voltage DC bus 29 and the multi-phase motor control power bus 31 to control operation of the electric machine 35.

Internal parameters originating in the gate drive circuit 15 and monitored parameters 112 from the power switches 13 that are communicated to a monitoring circuit 17 are provided as feedback 108 to the MCP 16 for control and analysis. The internal parameters include electric current flow and others that can be employed to determine temperature of the electric machine 35. The temperature of the electric machine 35 can be determined by any suitable scheme, including by way of example, direct measurement with a thermistor or another temperature monitoring sensor or estimation based upon the aforementioned internal parameters and monitored parameters 112, and coolant flow in a cooling system heat exchange configuration, if any. In one embodiment, the MCP 16 generates a temperature signal 104 that is communicated to the controller 11.

The electric machine 35 can be any suitable multi-phase electric motor, e.g., an induction motor or a synchronous motor that converts electrical energy to mechanical power in the form of torque, and includes a stator and a coaxial rotor. The stator includes a plurality of windings fabricated from insulated conductive wires arranged as coils that form magnetic poles when electrically energized.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines.

Figure 2:
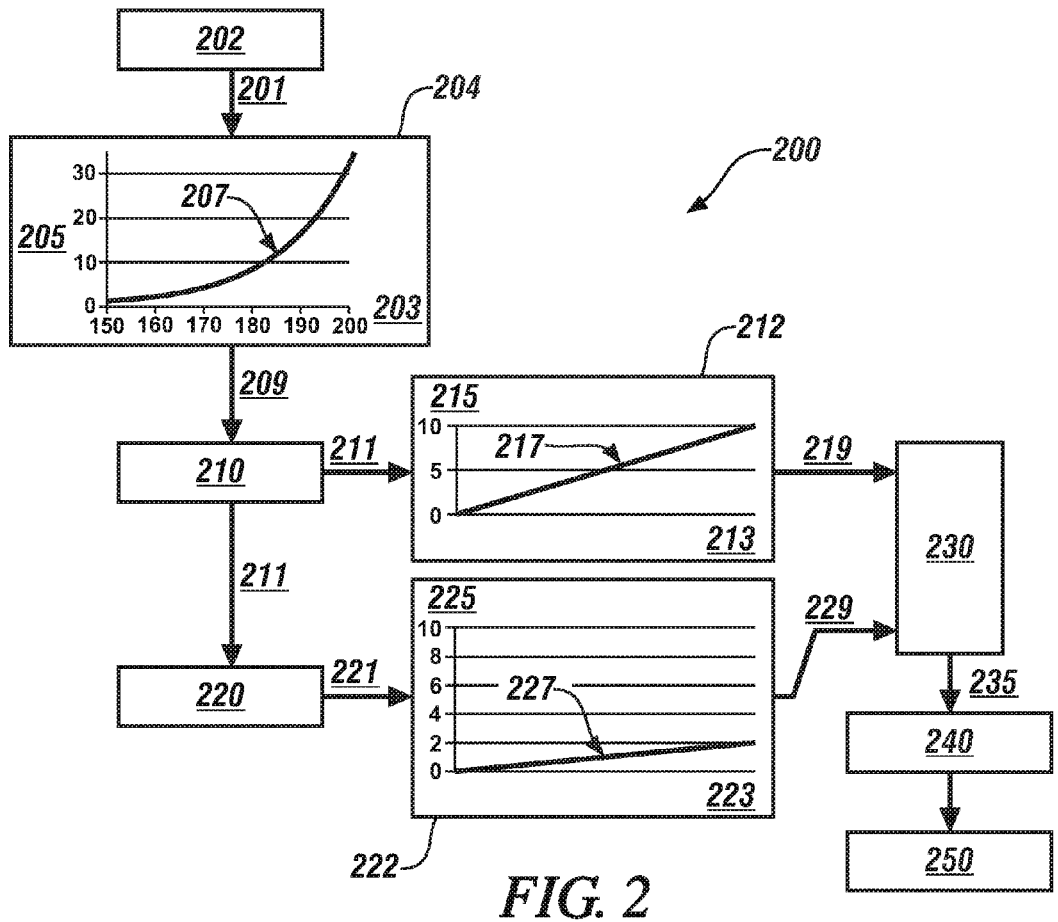
FIG. 2 schematically shows a flowchart of a motor torque derate routine that is iteratively executed during ongoing operation to determine a derated motor torque for dynamically controlling an electric machine based upon a time-integrated temperature of the electric machine, in accordance with the disclosure.

FIG. 2 is a flowchart configured to describe execution of a motor torque derate routine 200, which is preferably iteratively executed during operation of an electric machine to determine a derated motor torque for dynamically controlling the electric machine based upon a time-integrated temperature of the electric machine, e.g., the electric machine 35 described with reference to FIG. 1. Table 1 is provided as a key wherein the numerically labeled blocks and the corresponding functions are set forth as follows, corresponding to the motor torque derate routine 200.

TABLE 1

| BLOCK | BLOCK CONTENTS |
|---|---|
| 200 | Motor torque derate routine |
| 202 | Monitor temperature |
| 204 | Determine aging parameter periodically |
| 210 | Determine short-term aging effect based upon periodically determined aging parameters |
| 212 | Determine short-term temperature adjustment based upon short-term aging effect |
| 220 | Determine long-term aging effect based upon the short-term aging effect |
| 222 | Determine long-term temperature adjustment based upon long-term aging effect |
| 230 | Accumulating the long-term temperature adjustment and the short-term temperature adjustment |
| 240 | Determine derated motor torque |
| 250 | Control electric machine based upon derated motor torque |

Execution of the motor torque derate routine 200 is described in context of a driving cycle for an electric machine, wherein a driving cycle is defined as a period of time starting with a key-on command from an operator and ending with a subsequent key-off command from the operator when the electric machine is employed on a vehicle. Dynamic operation and conditions indicate the ongoing, second-by-second control, operation and monitoring of the electric machine during each driving cycle. The motor torque derate routine 200 executes by dynamically monitoring or otherwise determining motor temperature 201 for the electric machine during operation (202) at a sampling rate that comprehends thermal time constants of the various components and systems of the electric machine. The motor temperature 201 can be determined by any suitable method and/or device, including, e.g., by direct measurement of temperature on the electric machine, by inference from measurement of temperature at a related location, by estimation based upon monitored parameters related to operation of the electric machine, or by some combination thereof. In one embodiment, the motor temperature 201 is determined at a sampling rate of 1 Hz, although other sampling rates may be employed with similar effect.

An aging parameter 209 is periodically determined based upon the motor temperature 201 using a temperature-aging relationship 207 that has been developed for the subject electric machine (204). The temperature-aging relationship 207 is graphically shown with magnitude of the aging parameter on the vertical axis 205 and motor temperature on the horizontal axis 203. The temperature-aging relationship 207 is empirically developed and comprehends effects of changes in the physical and chemical properties of the specific insulative material employed for the insulated conductive wires of the stator of the electric machine. The temperature-aging relationship 207 accounts for the nature and duration of electrical, mechanical, thermal and environmental stresses applied to the insulative material that cause fatigue of the insulative material. Fatigue is the weakening of a material caused by repeatedly applied stresses resulting in progressive and localized structural damage due to cyclic loading. The temperature-aging relationship 207 can be based upon a life-temperature relationship for the insulative material that is based upon an expectation that functional life of the insulated conductive wires of the stator and hence the service life of the electric machine is proportional to the inverse reaction rate of the process due to temperature, e.g., an Arrhenius life-stress relationship. Measurements related to low-cycle fatigue provide a quantifiable measure of material aging that accrue over time as a function of cyclically applied loads related to elevated motor temperature and can be described using known relationship forms, e.g., a Coffin-Manson relationship.

A short-term aging effect 211 is determined by ongoingly accumulating the periodically determined aging parameters 209 (210). Accumulating the periodically determined aging parameters preferably includes dynamically monitoring and integrating the periodically determined aging parameters 209, with the short-term aging effect regularly updated during each vehicle driving cycle. This preferably includes updating the short-term aging effect 211 after each aging parameter is determined.

Accumulating the periodically determined aging parameters 209 includes dynamically monitoring and integrating the periodically determined aging parameters, which can be accomplished using a suitable cumulative model related to aging and fatigue. In one embodiment, this can include executing a Miner's rule calculation that sums ratios of time at temperature and capability at temperature according to the following:

$$CumAging = \sum_{Tmin}^{Tmax} \frac{Time(Ti)}{Capability(Ti)} \quad [1]$$

wherein

CumAging is an index associated with cumulative aging,

Tmax is a maximum temperature,

Tmin is a minimum temperature,

Time(Ti) is amount of operating time at temperature Ti, and

Capability(Ti) is service life at temperature Ti.

Figure 4:
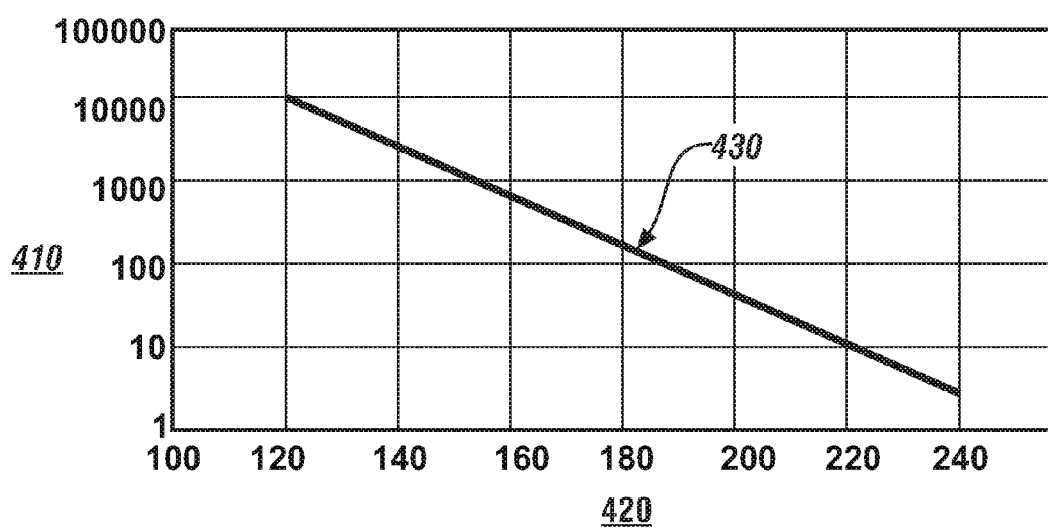
FIG. 4 graphically shows a thermal aging curve for an electric machine, including total service life (hours) in relation to motor temperature (° C.) in accordance with the disclosure.

The service life at temperature Ti, i.e., Capability(Ti) is determined using a service life calculation that has been predetermined using a representative model of the motor that has been developed for the subject electric machine and corresponds to the temperature-aging relationship 207 previously described. FIG. 4 graphically shows an example of a temperature-based service life for a representative electric machine, with total service life (hours) 410 on the vertical axis in relation to motor temperature (° C.) 420 on the horizontal axis. The scale of the vertical axis is logarithmic with the total service life (hours) 410. A relationship 430 between the total service life and the motor temperature is shown, and indicates a reduction in motor service life with an increase in accumulated time at an elevated operating temperature of the electric machine.

Referring again to FIG. 2, a short-term temperature adjustment 219 is periodically determined based upon the short-term aging effect 211 using a short-term temperature-adjustment relationship 217 that has been developed for the subject electric machine (212). The short-term temperature-adjustment relationship 217 is graphically shown with temperature adjustment (° C.) on the vertical axis 215 and short-term aging on the horizontal axis 213. The short-term temperature-adjustment relationship 217 comprehends a relation between elevated temperatures in the electric machine and induced material stress and fatigue in the short-term, which can be empirically developed. Thus, there may be benefit to a temperature-based derating of torque output of the electric machine to dynamically reduce output torque capability of the electric machine to reduce aging and thus improve service life of the electric machine. By way of example, the short-term temperature-adjustment relationship 217 is imposed upon a temperature-based motor torque derating curve, examples of which are shown with reference to FIG. 3. The short-term temperature-adjustment relationship 217 provides a temperature adjustment in the form of a reduction in temperature that ranges from 0° C. at a low magnitude for the short-term aging effect 211 to 10° C. at a high magnitude for the short-term aging effect 211, with the reductions in temperature imposed upon the temperature-based motor torque derating curve. The short-term temperature-adjustment relationship 217 is application-specific, and can be implemented as a lookup table or an executable equation in a controller. The short-term temperature adjustment 219 resets to zero at the beginning of each driving cycle.

A long-term aging effect 221 is determined by accumulating the periodically determined short-term aging effects 211 and integrating the accumulated short-term aging effects at the end of each driving cycle with a long-term aging effect determined during a previous driving cycle (220). A long-term temperature adjustment 229 is periodically determined based upon the long-term aging effect 221 using a long-term temperature-adjustment relationship 227 that has been developed for the subject electric machine (222). The long-term temperature-adjustment relationship 227 is graphically shown with temperature adjustment (° C.) on the vertical axis 225 and long-term aging on the horizontal axis 223. The long-term temperature-adjustment relationship 227 comprehends that elevated temperatures in the electric machine can induce material stress and fatigue in the long-term, and can be empirically developed. Thus, there may be benefit to a temperature-based derating of torque output of the electric machine to reduce output torque capability of the electric machine to reduce aging and thus improve service life of the electric machine. By way of example, the long-term temperature-adjustment relationship 227 is imposed upon the temperature-based motor torque derating curve, examples of which are shown with reference to FIG. 3. By way of example, the long-term temperature-adjustment relationship 227 ranges from 0° C. at a low magnitude for the long-term aging effect 221 to 2° C. at a high magnitude for the long-term aging effect 221, with the reductions in temperature imposed upon the temperature-based motor torque derating curve. The long-term temperature-adjustment relationship 227 is application-specific and can be implemented as a lookup table or an executable equation in a controller.

The long-term temperature adjustment 229 and the short-term temperature adjustment 219 are accumulated, e.g., by summing to determine an aging-based temperature adjustment (230). The aging-based temperature adjustment 235 is employed to determine an aging-based derated motor torque for the electric machine (240), and operation of the electric machine is dynamically controlled based upon the derated motor torque, including limiting torque output from the electric machine using the aging-based derated motor torque (250).

Figure 3:
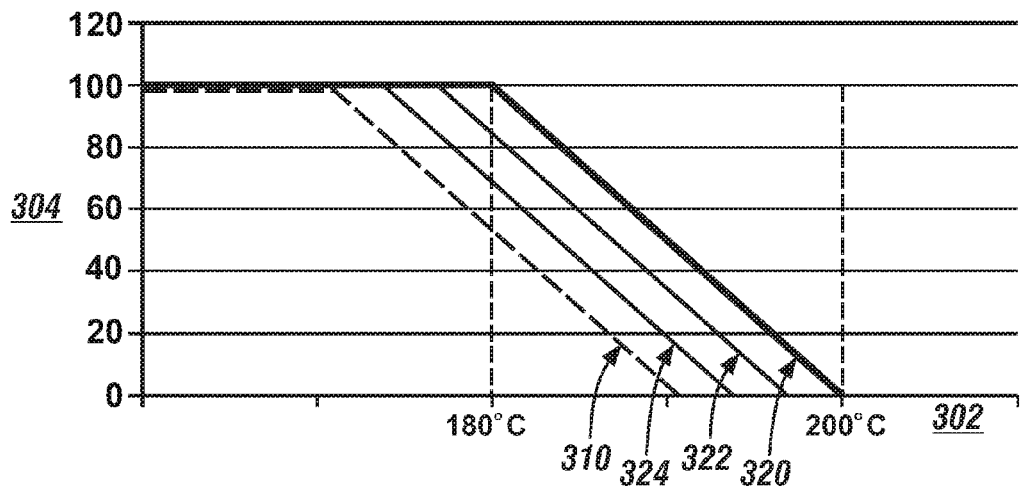
FIG. 3 graphically shows a plurality of aging-based derated motor torques plotted with torque derating in the form of allowed percentage of maximum torque in relation to temperature, in accordance with the disclosure.

FIG. 3 graphically shows a plurality of temperature-based motor torque derating curves plotted with torque derating in the form of allowed percentage of maximum motor torque on the vertical axis 304 and motor temperature on the horizontal axis 302. Line 310 depicts a temperature-based motor torque derating curve for a known electric machine employing a simple temperature-based derating system, and shows 100% of the maximum torque is allowed up to a motor temperature of 170° C., with a linear decline to 0% of the maximum torque allowed at a motor temperature of 190° C. Line 320 depicts a temperature-based motor torque derating curve for the same electric machine employing an embodiment of the motor torque derate routine 200 described with reference to FIG. 2. Line 320 shows 100% of the maximum torque is allowed up to a motor temperature of 180° C., with a linear decline to 0% of the maximum torque allowed up at a motor temperature of 200° C. when the electric machine is in a new condition. Lines 322 and 324 depict temperature-based motor torque derating curves for the same electric machine employing the motor torque derate routine 200 and showing decreases in the maximum temperature at which 100% of the maximum torque is allowed below a motor temperature of 180° C., with a corresponding linear decline to 0% of the maximum torque. Such derating may be short-term and reversible when due to short-term temperature excursions with the electric machine in a new condition. Such derating may be long-term and irreversible when due to repeated occurrences of short-term temperature excursions as the electric machine experiences operational aging.

Thus, in an operating environment for an electric machine that experiences few excursions into high loads and high temperatures, likelihood of motor damage is low and the control system can operate with a motor torque derating scheme that permits motor temperatures that are 10° C. higher than a system employing a simple temperature-based derating system in one embodiment. Such a configuration enables short excursions to higher temperatures, for brief periods of time providing full motor torque capability. When an electric machine operates at elevated motor temperatures, the motor torque derate routine described herein will shift the torque derating scheme to the nominal values. The short-term aging effect immediately and dynamically influences the derating strategy. The long-term aging effect is purposely weighted to a much lesser degree, to moderately influence the derating strategy under dynamic conditions. As such the control system improves intermittent performance and extends motor life.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a high-voltage electric machine of a ground vehicle, comprising:
   periodically determining an aging parameter based upon a temperature of the electric machine;
   periodically determining a short-term aging effect based upon the periodically determined aging parameter;
   determining a long-term aging effect based upon the short-term aging effect;
   determining a short-term temperature adjustment based upon the short-term aging effect;
   determining a long-term temperature adjustment based upon the long-term aging effect;
   determining a temperature-based derated motor torque based upon the long-term temperature adjustment and the short-term temperature adjustment; and
   controlling, by a controller, operation of the electric machine based upon the temperature-based derated motor torque.

2. The method of claim 1, wherein periodically determining an aging parameter based upon the temperature of the electric machine comprises:
   empirically developing a temperature-aging relationship based upon temperature-induced changes in insulative material of insulated conductive wires of the electric machine; and
   periodically determining the aging parameter based upon the temperature of the electric machine and the empirically developed temperature-aging relationship.

3. The method of claim 2, wherein empirically developing a temperature-aging relationship based upon temperature-induced changes in insulative material of insulated conductive wires of the electric machine comprises empirically developing the temperature-aging relationship based upon fatigue of the insulative material induced by cyclically applied loads related to temperature of the electric machine.

4. The method of claim 1, wherein periodically determining a short-term aging effect based upon the periodically determined aging parameters comprises dynamically integrating the periodically determined aging parameters during each driving cycle.

5. The method of claim 1, wherein determining a long-term aging effect based upon the short-term aging effect comprises accumulating the periodically determined short-term aging effects and, at the end of a present driving cycle, integrating the accumulated short-term aging effects with a long-term aging effect determined during a previous driving cycle.

6. The method of claim 1, wherein determining a short-term temperature adjustment based upon the short-term aging effect comprises dynamically determining a short-term adjustment in temperature based upon a temperature-induced material stress in the electric machine.

7. The method of claim 6, further comprising resetting the short-term temperature adjustment to zero at the beginning of each driving cycle.

8. The method of claim 1, wherein determining a long-term temperature adjustment based upon the long-term aging effect comprises determining a long-term adjustment in temperature based upon temperature-induced material stress in the electric machine, said long-term temperature adjustment updated once each driving cycle.

9. The method of claim 1, wherein controlling, by a controller, operation of the electric machine based upon the temperature-based derated motor torque comprises dynamically controlling maximum torque output of the electric machine, said maximum torque output limited by the temperature-based derated motor torque.

10. A method for operating an electrically-powered torque machine configured to generate tractive torque in a ground vehicle, comprising:
    periodically determining an aging parameter based upon a temperature of the electric machine;
    determining a short-term aging effect based upon an accumulation of the periodically determined aging parameter;
    determining a long-term aging effect based upon an accumulation of the short-term aging effect;
    determining a short-term temperature adjustment based upon the short-term aging effect;
    determining a long-term temperature adjustment based upon the long-term aging effect;
    determining a temperature-based derated motor torque based upon the long-term temperature adjustment and the short-term temperature adjustment; and
    controlling, by a controller, operation of the electric machine responsive to an operator command for torque limited based upon the temperature-based derated motor torque.

11. The method of claim 10, wherein periodically determining an aging parameter based upon a temperature of the electric machine comprises:
    empirically developing a temperature-aging relationship based upon fatigue of the insulative material induced by cyclically applied loads related to temperature of the electric machine; and
    periodically determining the aging parameter based upon the temperature of the electric machine and the empirically developed temperature-aging relationship.

12. The method of claim 10, wherein determining a short-term aging effect based upon an accumulation of the periodically determined aging parameters comprises dynamically integrating the periodically determined aging parameters during each driving cycle.

13. The method of claim 10, wherein determining a long-term aging effect based upon an accumulation of the short-term aging effect comprises accumulating the short-term aging effects and, at the end of a present driving cycle, integrating the accumulated short-term aging effects with a long-term aging effect determined during a previous driving cycle.

14. The method of claim 10, wherein determining a short-term temperature adjustment based upon the short-term aging effect comprises dynamically determining a short-term adjustment in temperature based upon a temperature-induced material stress in the electric machine.

15. The method of claim 14, further comprising resetting the short-term temperature adjustment to zero at the beginning of each driving cycle.

16. The method of claim 10, wherein determining a long-term temperature adjustment based upon the long-term aging effect comprises determining a long-term adjustment in temperature based upon temperature-induced material stress in the electric machine, said long-term temperature adjustment updated once each driving cycle.

17. The method of claim 10, wherein controlling, by a controller, operation of the electric machine responsive to an operator command for torque limited based upon the temperature-based derated motor torque comprises dynamically controlling operation of the electric machine responsive to the operator command for torque limited based upon a maximum torque output of the electric machine, said maximum torque output limited by the temperature-based derated motor torque.

* * * * *